(12) United States Patent
Latronico et al.

(10) Patent No.: US 8,522,443 B2
(45) Date of Patent: Sep. 3, 2013

(54) CUTTING EDGE FOR A CUTTING TOOL

(75) Inventors: Mark B. Latronico, Charlotte, NC (US); Joseph Lutgen, Lake Forest, CA (US)

(73) Assignee: Irwin Industrial Tool Company, Huntersville, NC (US)

( * ) Notice: Subject to any disclaimer, the term of this patent is extended or adjusted under 35 U.S.C. 154(b) by 313 days.

(21) Appl. No.: 12/875,522

(22) Filed: Sep. 3, 2010

(65) Prior Publication Data

US 2012/0055030 A1    Mar. 8, 2012

(51) Int. Cl.
*B26B 17/00* (2006.01)
*B25F 1/00* (2006.01)
*B21K 11/00* (2006.01)

(52) U.S. Cl.
USPC ............ 30/186; 30/175; 7/107; 76/104.1

(58) Field of Classification Search
USPC ......... 30/175, 186; 7/107; 76/101.1, 104.1
See application file for complete search history.

(56) References Cited

U.S. PATENT DOCUMENTS

| | | | |
|---|---|---|---|
| 975,385 A * | 11/1910 | Chappel .......................... 30/186 |
| 2,445,480 A | 7/1948 | Gantt | |
| 2,595,368 A | 5/1952 | Plautz | |
| 4,028,756 A * | 6/1977 | Couto ............................... 7/107 |
| 4,048,877 A | 9/1977 | Undin | |
| 4,225,990 A | 10/1980 | Theiler, Sr. | |
| 4,229,849 A * | 10/1980 | Theiler, Sr. ........................ 7/107 |
| 4,337,542 A * | 7/1982 | Theiler, Sr. ........................ 7/107 |
| 4,534,827 A * | 8/1985 | Henderson .................... 216/101 |
| 4,748,876 A | 6/1988 | Solf et al. | |
| 5,033,195 A * | 7/1991 | Appelkvist et al. ............. 30/254 |
| 7,111,376 B2 * | 9/2006 | Lombardi et al. .............. 29/428 |
| 2004/0244539 A1 * | 12/2004 | Korb et al. .................... 76/104.1 |
| 2012/0055030 A1 * | 3/2012 | Latronico et al. ............... 30/186 |

FOREIGN PATENT DOCUMENTS

| | | |
|---|---|---|
| DE | 871579 | 3/1953 |
| DE | 3344861 A1 | 12/1984 |
| DE | 29503634 U1 | 7/1995 |
| FR | 2910364 A3 | 12/2006 |
| GB | 2299964 A | 10/1996 |
| JP | 11077425 A | 3/1999 |
| JP | 2002052424 A | 2/2002 |
| WO | 9711816 A2 | 4/1997 |
| WO | 2007099349 A2 | 9/2007 |

OTHER PUBLICATIONS

Intellectual Property Office, Combined Search and Examination Report, GB1114755.0, Dec. 15, 2011.
Irwin Industrial Tools Company, German Application No. 10 2011 112 484.9, Office Action, Jun. 21, 2012.
Irwin Industrial Tools Company, UK Application No. GB1114755.0, Office Action, Oct. 18, 2012.

* cited by examiner

*Primary Examiner* — Hwei C Payer
(74) *Attorney, Agent, or Firm* — Dennis J. Williamson; Moore & Van Allen PLLC

(57) ABSTRACT

A cutting tool comprises a first cutting edge and a second cutting edge movable into engagement with one another. The first cutting edge comprises an edge tip extending along at least a portion of the cutting edge. The edge tip has a geometry that lowers the cutting force required to cut hard articles and minimizes damage to the cutting edge. The edge tip has a flat end face defining a first edge and a second edge. A first side face extends from the first edge and a second side face extends from the second edge where the first side face and the second side face extend at an angle relative to one another such that the first side face and the second side face diverge as they extend away from the flat end face.

21 Claims, 8 Drawing Sheets

CUTTING EDGE FOR A CUTTING TOOL

The invention relates generally to cutting tools such as cutting pliers and more particularly to improve cutting edge for such tools.

BACKGROUND

Cutting tools such as cutting pliers are known that are used to cut articles such as wire. The typical cutting tool comprises a first jaw connected to a second jaw at a pivot such that the jaws may be moved toward and away from one another. The jaws include cutting edges that are disposed opposite to one another such that the cutting edges engage one another when the jaws are closed. A handle may be connected to each jaw where the handles act as levers to close the jaws when the handles are squeezed by an end user. An article may be located between the jaws and the jaws closed such that the cutting edges engage and sever the article.

SUMMARY OF THE INVENTION

A cutting tool comprises a first cutting edge and a second cutting edge movable into engagement with one another. The first cutting edge comprises an edge tip extending along at least a portion of the cutting edge. The edge tip has a flat end face defining a first edge and a second edge where the flat end face has a width in the range of 0.002 to 0.008 inches. A first side face extends from the first edge and a second side face extends from the second edge where the first side face and the second side face extend at an angle relative to one another such that the first side face and the second side face diverge as they extend away from the flat end face. The first side face and the second side face are disposed at an angle relative to one another in the range of 66 degrees to 74 degrees.

A cutting tool comprises a first cutting edge and a second cutting edge movable into engagement with one another. The first cutting edge comprises an edge tip extending along at least a portion of the cutting edge where the edge tip has a flat end face defining a first edge and a second edge. A first side face extends from the first edge and a second side face extends from the second edge where the first side face and the second side face diverge as the first side face and the second side face extend away from the end face. The cross-sectional area of the edge tip between the end face and a transverse line 0.04 inches from the end face is approximately 0.001 square inches.

A plane may extend through the center of the first cutting edge and the second cutting edge where the edge tip is symmetrical about the plane. The first cutting edge may be formed on a first jaw and the first jaw may be operatively connected to a first lever arm and the second cutting edge may be formed on the second jaw and the second jaw may be operatively connected to a second lever arm. The first lever arm may be pivotably connected directly to the second lever arm. The first lever arm may be pivotably connected to the first jaw. The first lever arm may be formed integrally with the first jaw and the second lever arm may be formed integrally with the second jaw. The second cutting edge may comprise a second edge tip extending along at least a portion of the second cutting edge where the second edge tip may have a second flat end face defining a third edge and a fourth edge. The first jaw and second jaw may comprise gripping surfaces. The first cutting edge may extend for the length of the first jaw and the second cutting edge may extend for the length of the second jaw. The width of the end face may be preferably 0.005 inches. The end face may be a leading edge of the edge tip making contact with the opposed cutting edge. The edge tip may define a central axis and the first side face and second side face may extend at an angle of between 33 and 37 degrees with respect to the central axis. The first side face and the second side face may extend from the flat end face a distance of 0.015 inches. A first relief surface may extend from the first side face and a second relief surface may extend from the second side face. The first relief surface and the second relief surface extend at an angle to one another where the first relief surface and the second relief surface diverge as they extend away from the first side face and the second side face. The first relief surface and the second relief surface may be disposed at an approximate angle relative to one another of 30 degrees. The first relief surface and the second relief surface may extend from the first side face and second side face a distance of 0.040 inches from the end face.

DETAILED DESCRIPTION OF EMBODIMENTS OF THE INVENTION

Figure 1:
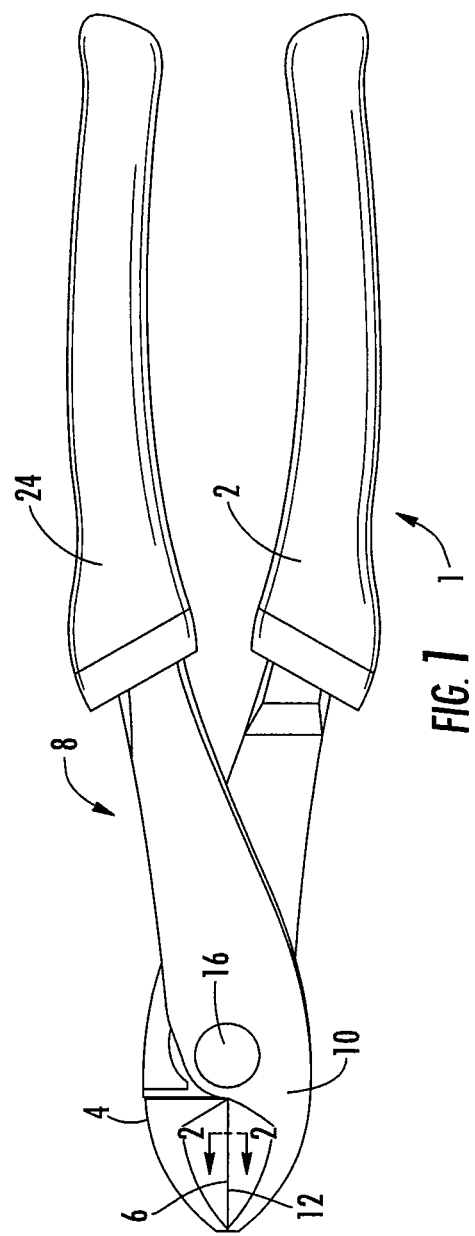
FIG. 1 is a side view of an embodiment of a diagonal pliers and cutting edge of the invention.

FIG. 1 shows an embodiment of a cutting tool implementing the cutting edge. While specific embodiments of edge-to-edge cutting pliers are shown, the cutting edge has applicability to any tool where the force generation characteristics and cutting edge durability of the cutting edge of the invention may be useful including powered cutting systems. The term "edge-to-edge" is used herein to refer to a cutting tool that operates by having the two cutting edges meet in abutting relationship when jaws are in the closed position. The cutting edge of the invention may also be used on edges that are offset or that move past one another during the cutting stroke.

Referring to FIG. 1 a first embodiment of a diagonal cutting tool is shown comprising a first lever assembly 1 that comprises a first handle 2 fixed to a first jaw 4. The first jaw 4 is formed with a first cutting edge 6. A second lever assembly 8 comprises a second handle 24 that is fixed to a second jaw 10. In one embodiment, the handles and jaws may be made integrally with one another and may have a one-piece construction. The second lever assembly 8 is pivoted to the first lever assembly 1 at pivot 16. The second jaw 10 comprises a second cutting edge 12. The second cutting edge 12 is disposed opposite to the first cutting edge 6 such that when jaws 4 and 10 are closed the cutting edges 6, 12 are in edge-to-edge contact with one another. The first jaw 4 can rotate toward and away from the second jaw 10 by manipulating handles 2 and 24 such that an article may be located between the cutting edges 6 and 12 and cut.

The invention relates to a cutting edge geometry for use in such cutting tools. The cutting force required to cut soft materials, such as electrical cable, is lowered by the geometry of the cutting edge. Cutting edges on such cutting tools may be damaged through use and abuse. The damage is often the result of cutting hard materials such as cable, wire, bolts or screws and may deform the cutting edges. The cutting edge geometry of the invention comprises an edge tip that lowers the cutting force required to cut through materials while providing an edge that is resistant to damage.

Figure 2:
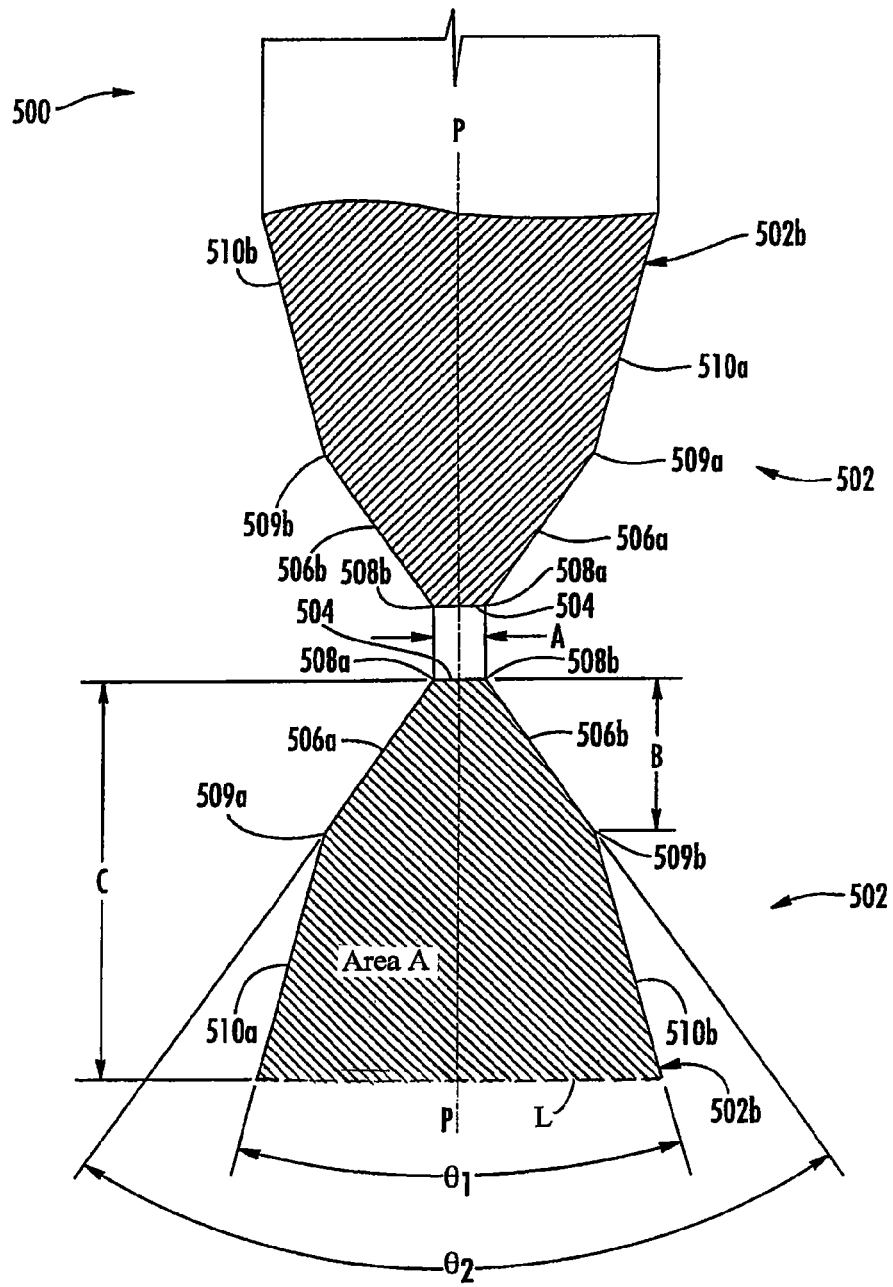
FIG. 2 is a section view of a first embodiment of using the cutting edge taken along line 2-2 of FIG. 1.
Figure 3:
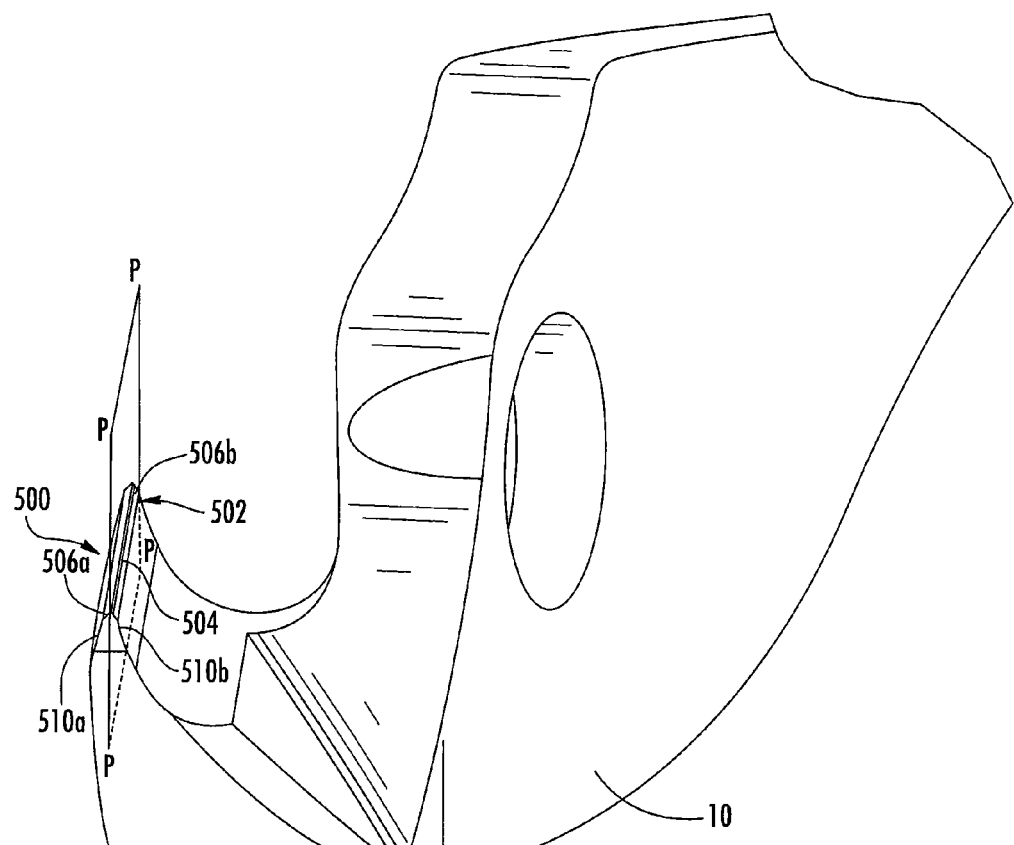
FIG. 3 is a partial perspective view showing a jaw with a cutting edge of the invention.

Referring to FIGS. 2 and 3 an embodiment of the cutting edge 500 with an edge tip 502 formed along the distal end of the cutting edge is shown. The shape of the edge tip will be described with reference to the plane p-p where plane p-p extends along the length of the cutting edge 500 and is centered on the edge tips 502. The plane p-p is the plane in which the edge tips 502 move toward one another as the cutting edges reach the fully closed position. When a cross-section of the edge tip 502 is taken perpendicular to plane p-p, the plane p-p represents the central axis of the cross-section of the tip as shown in FIG. 2. The outer surface 502b of the edge tip 502, shown in cross-section in FIG. 2, extends in three dimensions for the length of the cutting edge 500 such that at any cross-section of the edge tip, the shape of the outer surface of the edge tip has a geometry as shown in, and described with respect to, FIG. 2. The edge tip may be symmetrical about plane p-p. The cutting edge 500 with edge tip 502 may be used as the cutting edges in any of the illustrated cutting tools. While FIG. 2 shows two cutting edges each having the edge tip geometry of the invention, only one cutting edge may use the edge tip geometry of the invention.

The distal end of the edge tip 502 has a flat end face 504 that extends perpendicular to the central axis p-p of the cutting tip. The end face 504 forms a flat surface that has a width A within the range of 0.002 to 0.008 inches. Preferably, the end face 504 has a width A of approximately 0.005 inches. The flat end face 504 is the leading face of tip 500 and makes initial contact with the opposed cutting edge. Face 504 has a first edge 508a and a second edge 508b that extend for the length of face 504.

A first angled side face 506a extends from first edge 508a and a second angled side face 506b extends from second edge 508b. Side faces 506a, 506b extend at an angle relative to axis p-p such that the side faces diverge as they extend away from the flat end face 504. The side faces 506a, 506b are disposed at an angle ($\theta_2$) relative to one another in the range of 66 degrees to 74 degrees. The angled side faces 506a, 506b are disposed substantially symmetrically about axis p-p such that each face extends at an angle of between 33 and 37 degrees with respect to axis p-p. Each angled side face 506a, 506b extends from the flat end face 504 to edges 509a, 509b a vertical distance B along axis P-P of 0.015 inches.

Relief surfaces 510a, 510b extend from the edges 509a, 509b of side faces 506a and 506b, respectively. Relief surfaces 510a, 510b extend at an angle relative to axis p-p where the relief surfaces diverge as they extend away from the side faces 506a, 506b. The relief surfaces 510a, 510b are disposed at an angle ($\theta_1$) relative to one another of approximately 30 degrees. The relief surfaces 510a, 510b are disposed substantially symmetrically about axis p-p such that each face extends at an angle of approximately 15 degrees with respect to axis p-p. Relief surfaces 510a, 510b extend from the side faces 506a, 506b, respectively, along axis p-p a distance C of 0.040 inches from end surface 504 where the cutting tip 502 extends from the end face 504 to the ends of relief surfaces 510a, 510b. At a distance of 0.04 inches from the end face 504 the relief surfaces 510a, 510b may continue to diverge at angle ($\theta_1$) or these surfaces may extend at a different angle relative to one another including parallel to one another.

It has been found that an edge tip 502 comprising a series of planar faces that approximate the shape described with respect to FIGS. 2 and 3 that has a cross-sectional surface area A from the end face 504 to a distance 0.040 inches from the end face (as represented by dashed line L) that is approximately 0.001 square inches provides the improved cutting performance and durability of the invention.

Figure 4:
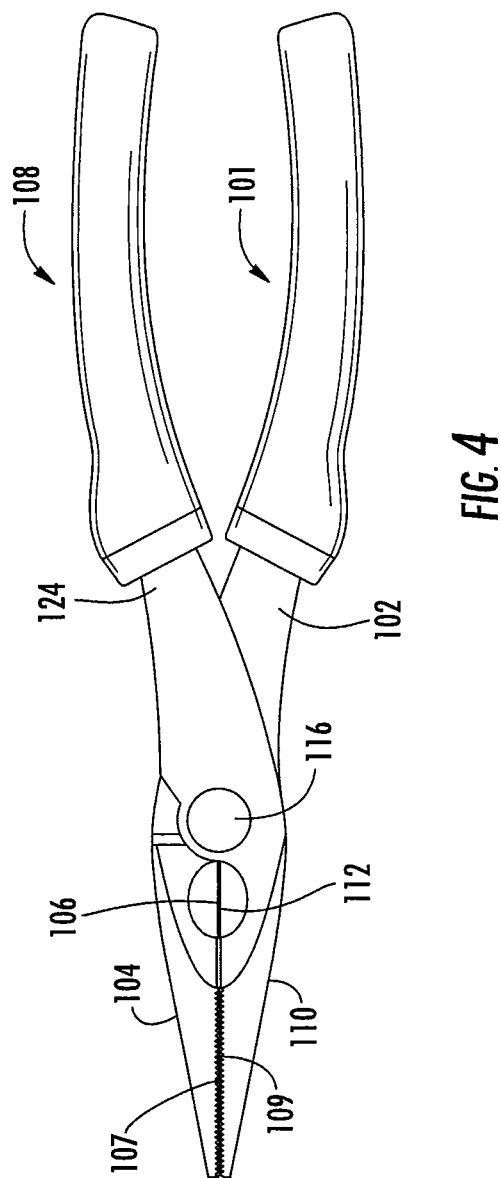
FIG. 4 is a side view of an embodiment of a long-nose pliers and cutting edge of the invention.
Figure 5:
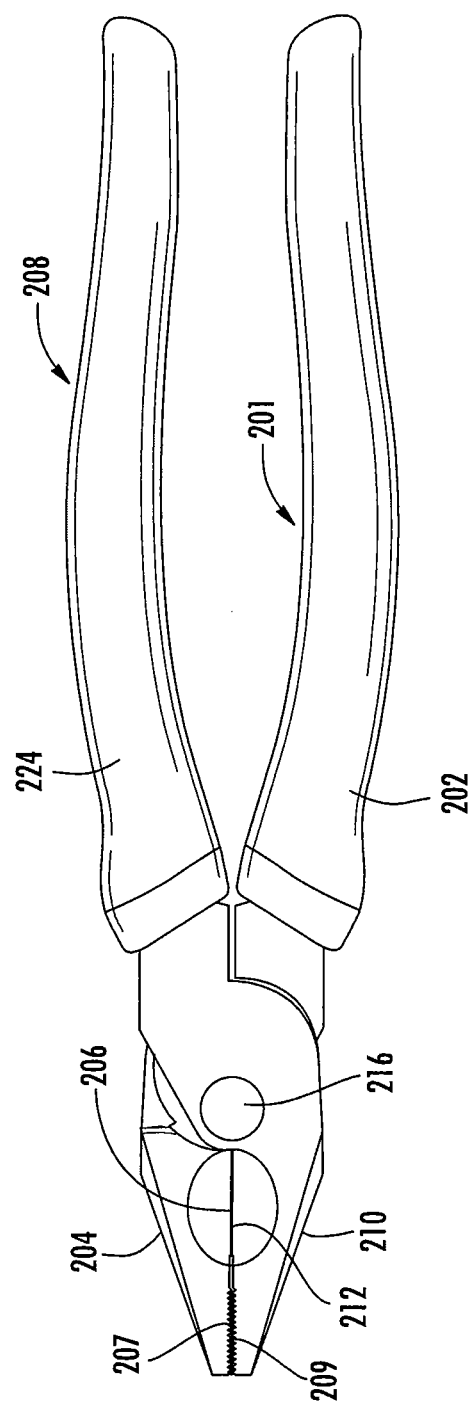
FIG. 5 is a side view of an embodiment of a linesman pliers and cutting edge of the invention.

While the cutting edge of the invention has been described with respect to the diagonal pliers of FIG. 1, the cutting edge may be used with a wide variety of cutting tools. FIG. 4 shows an embodiment of a long-nose pliers and FIG. 5 shows an embodiment of a linesman pliers having a two lever construction comprising a first lever assembly 101, 201 comprising a first handle 102, 202 that is fixed to a first jaw 104, 204. The first jaw 104, 204 is formed with a first cutting edge 106, 206. The first jaw 104, 204 also includes an elongated, tapered gripping face 107, 207 extending beyond the cutting edge 106, 206. A second lever assembly 108, 208 comprises a second handle 124, 224 that is fixed to a second jaw 110, 210. The second lever assembly 108, 208 is pivoted to the first lever assembly 101, 201 at pivot 116, 216. The second jaw 110, 210 comprises a second cutting edge 112, 212 and a second elongated, tapered gripping face 109, 209 extending beyond the cutting edge 112, 212. The second cutting edge 112, 212 is disposed opposite to the first cutting edge 106, 206, respectively, such that when jaws 104, 204 and 110, 210 are closed the cutting edges 106, 206 and 112, 212 are in edge-to-edge contact with one another. The gripping faces 107, 207 are also disposed opposite to faces 109, 209, respectively, such that an article may be gripped between the gripping faces. The jaws 204 and 210 and gripping faces 207 and 209 of a typical linesman pliers, shown in FIG. 5, are relatively shorter and blunter than the jaws 104 and 110 and gripping faces 107 and 109 of a typical long-nose pliers, shown in FIG. 4.

Figure 6:
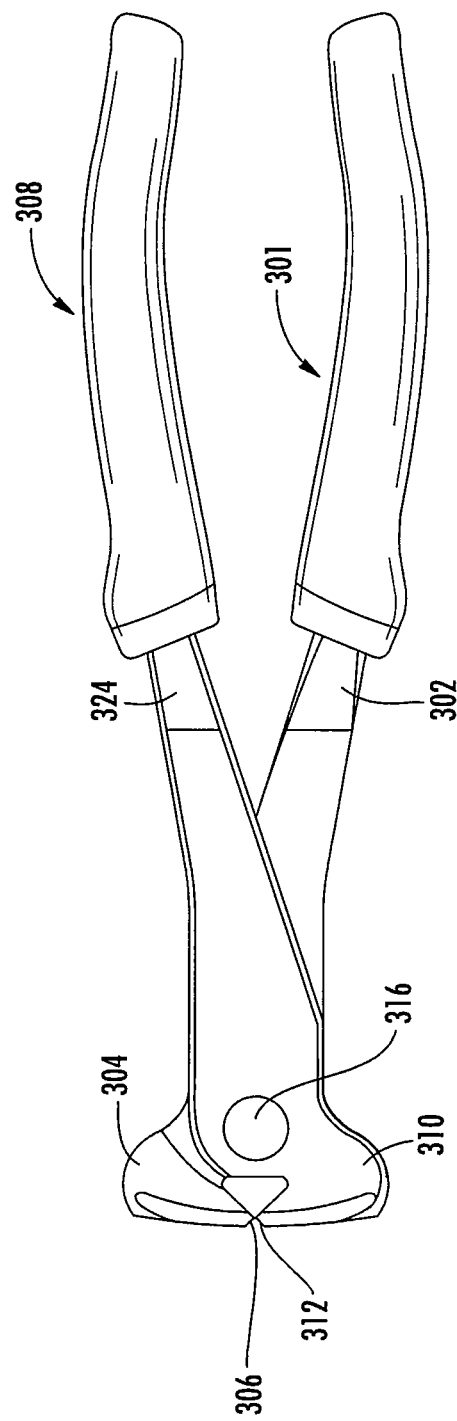
FIG. 6 is a side view of an embodiment of an end cutter and cutting edge of the invention.

FIG. 6 shows an embodiment of an end cutter having a two lever construction. The end cutter comprises a first lever assembly 301 comprising a first handle 302 that is fixed to a first jaw 304. The first jaw 304 is formed with a first cutting edge 306 that extends essentially parallel to the axis of rotation of the lever assemblies about pivot 316. The cutting edge 306 is oriented perpendicular to the cutting edge in the previously described embodiments. A second lever assembly 308 comprises a second handle 324 that is fixed to a second jaw 310. In one embodiment the handles and jaws may be made integrally with one another and may have a one-piece construction. The second lever assembly 308 is pivoted to the first lever assembly 301 at pivot 316. The second jaw 310 comprises a second cutting edge 312 that is opposed to cutting edge 306 such that the cutting edges 306, 312 extend substantially parallel to the pivot 316. The first jaw 304 can rotate toward and away from the second jaw 310 such that an article may be located between the cutting edges 306 and 312 and cut.

Figure 7:
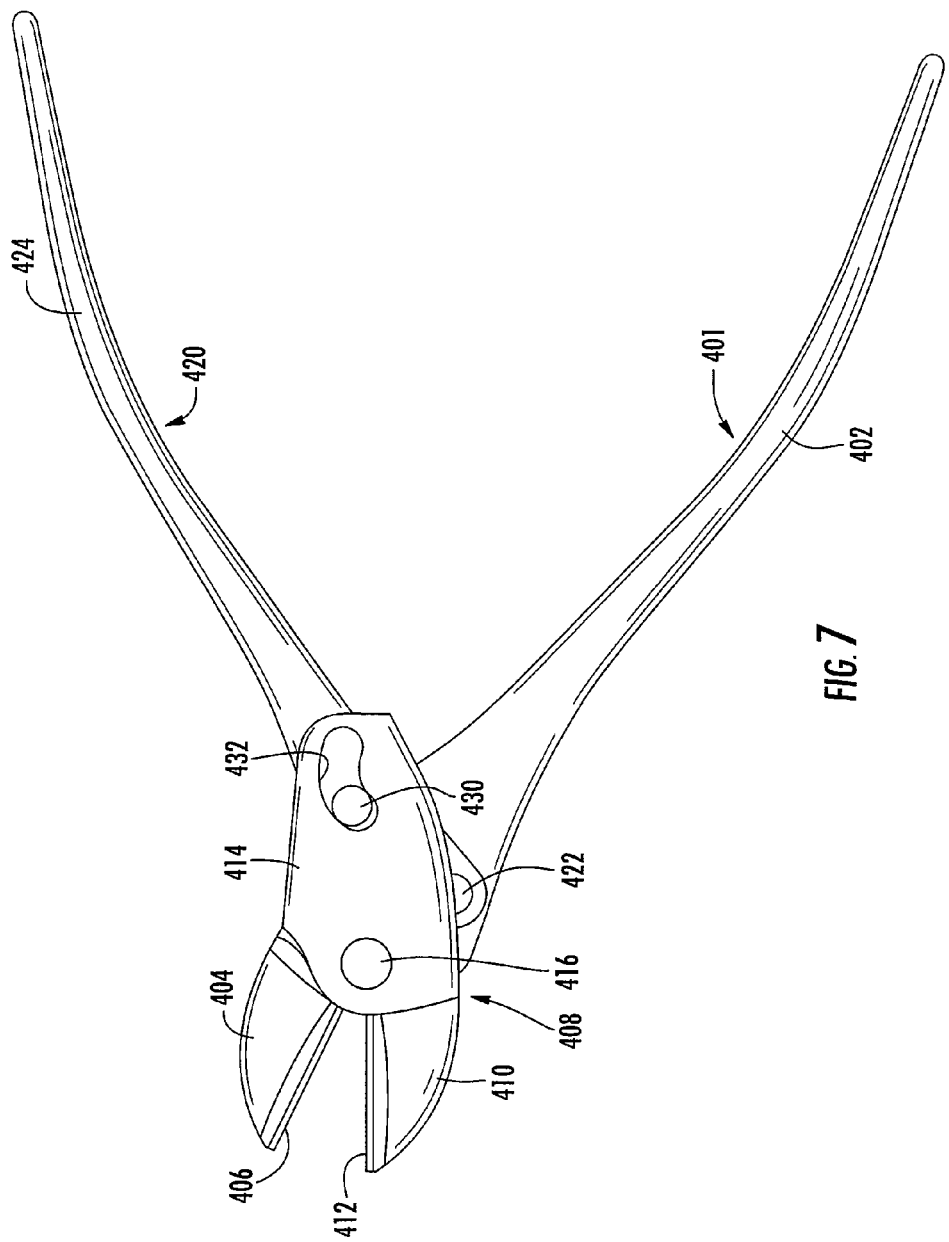
FIG. 7 is a side view of an embodiment of a diagonal pliers and cutting edge of the invention.
Figure 8:
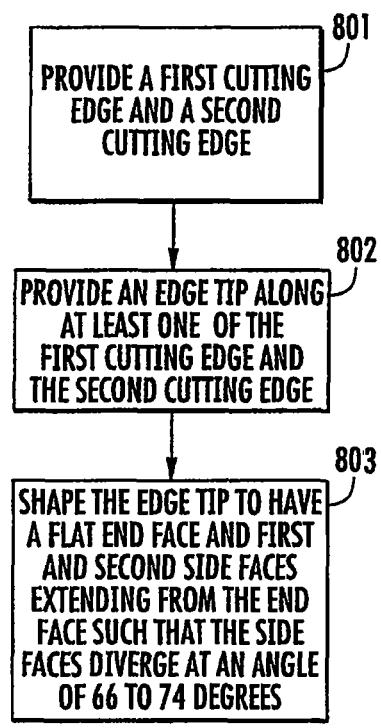
FIG. 8 is a block diagram of a method of making a cutting tool.

Referring to FIG. 7 an embodiment of a diagonal cutting tool is shown comprising a first lever assembly 401 that comprises a first handle 402 fixed to a first jaw 404 formed with a first cutting edge 406. A second lever assembly 408 comprising a second jaw 410 having a second cutting edge 412 is fixed to and pivoted relative to the first lever assembly 401 at pivot 416. The second cutting edge 412 is disposed opposite to the first cutting edge 406 such that when jaws 404 and 410 are closed the cutting edges 406, 412 are in edge-to-edge contact with one another. The second lever assembly 408 comprises a stub 414 located on the opposite side of pivot 416 from jaw 410.

A third lever assembly 420 is fixed to and pivoted relative to the first lever assembly 401 at a second pivot 422. The third lever assembly 420 is also connected to the second lever assembly 408 by a pin 430 formed on the third lever assembly 420 that engages a slot 432 formed on the stub 414 of the second lever assembly 408. The third lever assembly 420 comprises a handle 424 that extends generally opposite to the first handle 402. A user may press the handles toward one another such that the engagement of pin 430 with slot 432 rotates second lever assembly 408 to close the jaws 404 and 410. The cutting tools described above are provided by way of example. The cutting edge of the invention may be used on any cutting tool where the cutting edge construction described herein provides the cutting force and durability advantages described herein.

A method of making a cutting tool comprises providing a first cutting edge and a second cutting edge where the first cutting edge and the second cutting edge are movable into engagement with one another (block 801). One method of manufacturing a cutting edge is to forge the jaws pieces, machine the pieces, assemble the jaws together such as by a rivet, heat treat the jaws, and laser harden the edge. An edge tip is provided along at least a portion of the first cutting edge (block 802). The edge tip is shaped as previously described and may have a flat end face having a width within the range of 0.002 to 0.008 inches and a first angled side face extending from the flat end face and a second angled side face extending from the flat end face such that the first side face and second side face diverge as they extend away from the flat end face, the first side face and the second side face being disposed at an angle relative to one another in the range of 66 degrees to 74 degrees (block 803). The edge tip shape can be ground into the desired shape before or after assembly of the pliers. It is also possible to create inserts that have the shaped cutting edges where the inserts are separately attached to the jaws. The inserts may be manufactured using various methods including EDM, machining, grinding, and investment casting. Alternatively, the jaws and cutting edges may be investment cast, machined and assembled. Another alternate method of manufacturing is to investment cast the jaws and use composite construction for the handles.

While embodiments of the invention are disclosed herein, various changes and modifications can be made without departing from the spirit and scope of the invention as set forth in the claims. One of ordinary skill in the art will recognize that the invention has other applications in other environments. Many embodiments are possible. The following claims are in no way intended to limit the scope of the invention to the specific embodiments described above.

The invention claimed is:

1. A cutting tool comprising:
a first cutting edge and a second cutting edge, said first cutting edge and the second cutting edge being movable into engagement with one another;
said first cutting edge comprising an edge tip extending along at least a portion of said first cutting edge, said edge tip having a flat end face defining a first edge and a second edge where the flat end face has a width in the range of 0.002 to 0.008 inches;
a first side face extending from the first edge and a second side face extending from the second edge where the first side face and the second side face extend at an angle relative to one another such that the first side face and the second side face diverge as they extend away from the flat end face and are disposed at an angle relative to one another in the range of 66 degrees to 74 degrees wherein the edge tip defines a central axis and the first side face and the second side face extend at an angle of between approximately 33 and 37 degrees with respect to the central axis.

2. The cutting tool of claim 1 wherein the width is approximately 0.005 inches.

3. The cutting tool of claim 1 wherein the end face is a leading edge of the edge tip and makes contact with the second cutting edge.

4. The cutting tool of claim 1 wherein the first side face and the second side face extend from the flat end face a vertical distance of 0.015 inches.

5. The cutting tool of claim 1 further comprising a first relief surface extending from the first side face and a second relief surface extending from the second side face.

6. The cutting tool of claim 5 wherein the first relief surface and the second relief surface extend at an angle relative to one another where the first relief surface and the second relief surface diverge as they extend away from the first side face and the second side face, the first relief surface and the second relief surface are disposed at an angle relative to one another of approximately 30 degrees.

7. The cutting tool of claim 6 wherein the first relief surface and the second relief surface extend from the first side face and the second side face a vertical distance of 0.040 inches from the end face.

8. The cutting tool of claim 1 wherein the first cutting edge is formed on a first jaw and the first jaw is operatively connected to a first lever arm and the second cutting edge is formed on a second jaw and the second jaw is operatively connected to a second lever arm.

9. The cutting tool of claim 8 wherein the first lever arm is pivotably connected directly to the second lever arm.

10. The cutting tool of claim 8 wherein a third lever arm is pivotably connected to the first lever arm and the second lever arm.

11. The cutting tool of claim 8 wherein the first lever arm is formed integrally with the first jaw and the second lever arm is formed integrally with the second jaw.

12. The cutting tool of claim 8 wherein the first jaw and the second jaw comprise gripping surfaces.

13. The cutting tool of claim 8 wherein the first cutting edge extends for the length of the first jaw and the second cutting edge extends for the length of the second jaw.

14. The cutting tool of claim 1 wherein the second cutting edge comprises a second edge tip that is identical to the edge tip of the first cutting edge.

15. A cutting tool comprising:
a first cutting edge and a second cutting edge, said first cutting edge and the second cutting edge being movable into engagement with one another;
said first cutting edge comprising an edge tip extending along at least a portion of said first cutting edge, said edge tip having a flat end face defining a first edge and a second edge;
a first side face extending from the first edge and a second side face extending from the second edge where the first side face and the second side face diverge as the first side face and the second side face extend away from the end face, the cross-sectional area of the tip between the end face and a distance 0.04 inches from the end face is approximately 0.001 square inches.

16. The cutting tool of claim 15 wherein a plane extends through the center of the first cutting edge and the second cutting edge and the edge tip is symmetrical about the plane.

17. The cutting tool of claim 15 wherein said first cutting edge is formed on a first jaw and said first jaw is operatively connected to a first lever arm and said second cutting edge is formed on a second jaw and said second jaw is operatively connected to a second lever arm.

18. The cutting tool of claim 15 wherein the second cutting edge comprises a second edge tip extending along at least a portion of the second cutting edge, the second edge tip having a second flat end face defining a third edge and a fourth edge;

a third side face extending from the third edge and a fourth side face extending from the fourth edge where the cross-sectional area of the second edge tip between the second end face and a distance 0.04 inches from the second end face is approximately 0.001 square inches.

19. A method of making a cutting tool comprising;

providing a first cutting edge and a second cutting edge where the first cutting edge and the second cutting edge are movable into engagement with one another;

providing an edge tip along at a least a portion of the first cutting edge; shaping the edge tip to have a flat end face having a width within the range of 0.002 to 0.008 inches and a first angled side face extending from the flat end face and a second angled side face extending from the flat end face such that the first side face and the second side face diverge as they extend away from the flat end face, the first side face and the second side face being disposed at an angle relative to one another in the range of 66 degrees to 74 degrees wherein the edge tip defines a central axis and the first side face and the second side face extend at an angle of between approximately 33 and 37 degrees with respect to the central axis.

20. A cutting tool comprising:

a first cutting edge and a second cutting edge, said first cutting edge and the second cutting edge being movable into engagement with one another;

said first cutting edge comprising an edge tip extending along at least a portion of said first cutting edge, said edge tip having a flat end face defining a first edge and a second edge where the flat end face has a width in the range of 0.002 to 0.008 inches;

a first side face extending from the first edge and a second side face extending from the second edge where the first side face and the second side face extend at an angle relative to one another such that the first side face and the second side face diverge as they extend away from the flat end face and are disposed at an angle relative to one another in the range of 66 degrees to 74 degrees wherein the first side face and the second side face extend from the flat end face a vertical distance of 0.015 inches.

21. A cutting tool comprising:

a first cutting edge and a second cutting edge, said first cutting edge and the second cutting edge being movable into engagement with one another;

said first cutting edge comprising an edge tip extending along at least a portion of said first cutting edge, said edge tip having a flat end face defining a first edge and a second edge where the flat end face has a width in the range of 0.002 to 0.008 inches;

a first side face extending from the first edge and a second side face extending from the second edge where the first side face and the second side face extend at an angle relative to one another such that the first side face and the second side face diverge as they extend away from the flat end face and are disposed at an angle relative to one another in the range of 66 degrees to 74 degrees;

a first relief surface extending from the first side face and a second relief surface extending from the second side face wherein the first relief surface and the second relief surface extend at an angle relative to one another where the first relief surface and the second relief surface diverge as they extend away from the first side face and the second side face, the first relief surface and the second relief surface are disposed at an angle relative to one another of approximately 30 degrees.

* * * * *